United States Patent [19]

Krenzler

[11] Patent Number: 5,238,325

[45] Date of Patent: Aug. 24, 1993

[54] ARTIFICIAL REEF AND BEACH STABILIZER FORMED FROM AN ASSEMBLAGE OF VEHICLE TIRES

[76] Inventor: Leo M. Krenzler, 1142 Industry Dr., Seattle, Wash. 98188

[21] Appl. No.: 931,608

[22] Filed: Aug. 18, 1992

[51] Int. Cl.[5] .............................................. A01K 61/00
[52] U.S. Cl. ........................................ 405/21; 405/15; 405/25
[58] Field of Search ...................... 405/15–19, 405/21, 23, 25; 119/3

[56] References Cited

U.S. PATENT DOCUMENTS

| | | | |
|---|---|---|---|
| 3,884,042 | 5/1975 | Anderson et al. | |
| 3,928,701 | 12/1975 | Roehner | 428/222 |
| 3,933,124 | 1/1976 | Ledoux et al. | 119/2 |
| 4,022,434 | 5/1977 | Moore | 256/1 |
| 4,150,909 | 4/1979 | Hibarger et al. | 405/27 |
| 4,188,153 | 2/1980 | Taylor | 405/34 |
| 4,196,694 | 4/1980 | Buchanan | 119/3 |
| 4,334,499 | 6/1982 | Baass | 119/3 |

FOREIGN PATENT DOCUMENTS

| | | | |
|---|---|---|---|
| 1329712 | 8/1987 | U.S.S.R. | 119/2 |
| 1416597 | 8/1988 | U.S.S.R. | 405/17 |
| 1476041 | 4/1989 | U.S.S.R. | 405/16 |
| 1511313 | 9/1989 | U.S.S.R. | 405/16 |
| 1546540 | 2/1990 | U.S.S.R. | 405/16 |

Primary Examiner—Dennis L. Taylor
Assistant Examiner—John Ricci
Attorney, Agent, or Firm—Glenn D. Bellamy; Teresa J. Wiant

[57] ABSTRACT

A self-anchoring, artificial reef, and a self-anchoring beach stabilizer locatable to the bottom of a body of water, is provided from an assemblage (22, 22A, 22B) of used vehicle tires. Each vehicle tire (10) has sidewalls (16) and an interconnecting tread (12). At least some of the vehicle tires are radially severed completely through the sidewalls (16) and tread (12) to form opposite out ends (24), and partially severed substantially through the sidewalls (16) while maintaining an uncut tread portion (26). A plurality of cut tires (32) may be positioned together to form an assemblage (22, 22A, 22B). In the assemblage (22, 22A, 22B), the cut ends (24) of each severed tire (32) are oriented apart from each other. The configuration of the structure provides safe havens (14) for aquatic life when employed as a reef, and provides erosion stabilization characteristics when employed as a beach stabilizer.

10 Claims, 4 Drawing Sheets

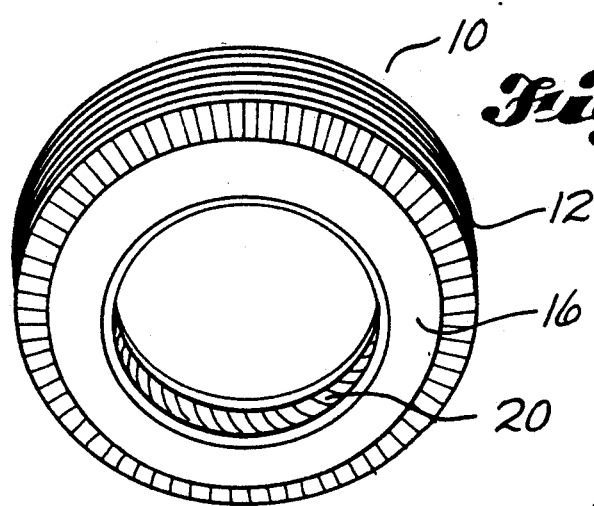
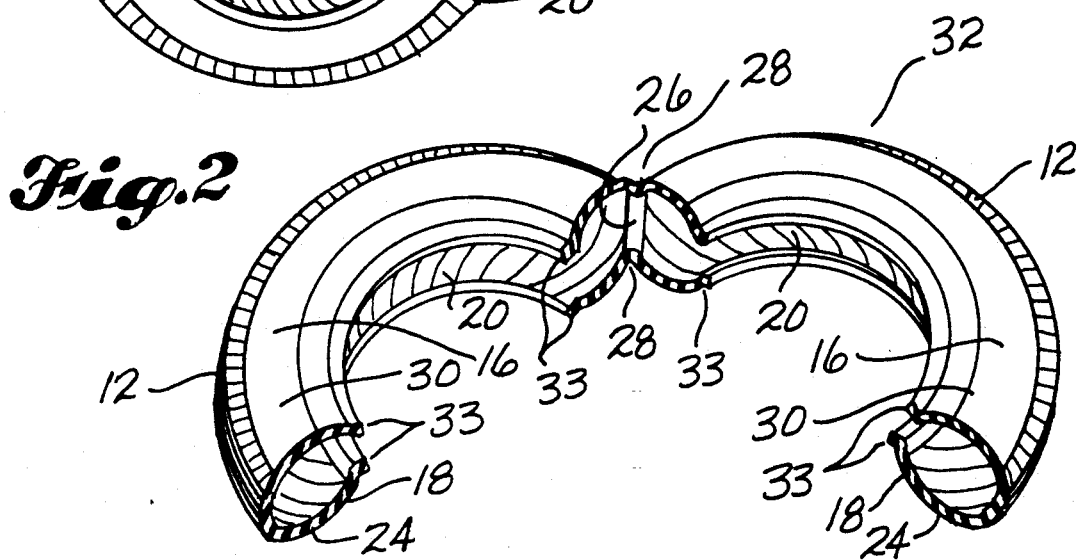
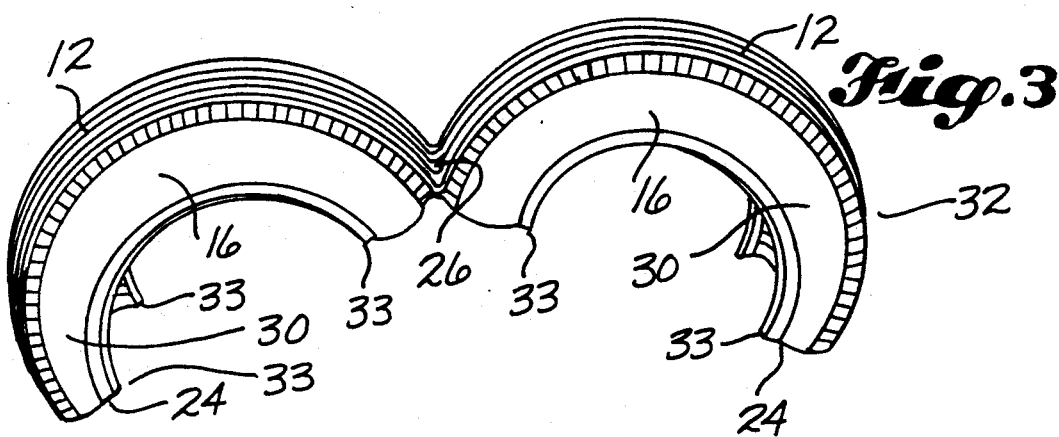
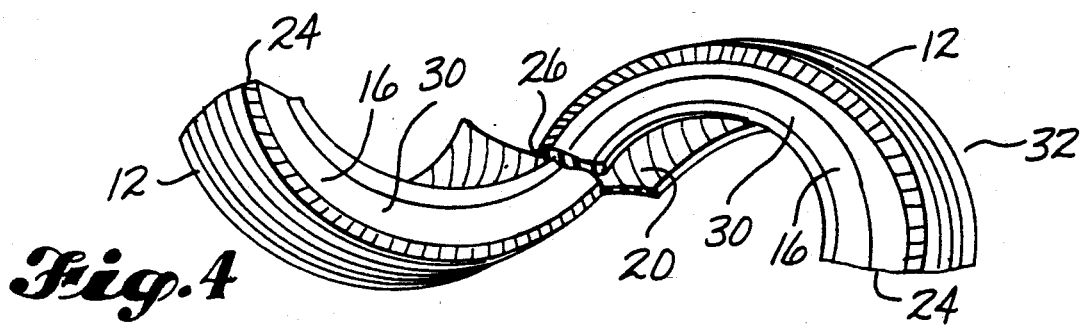

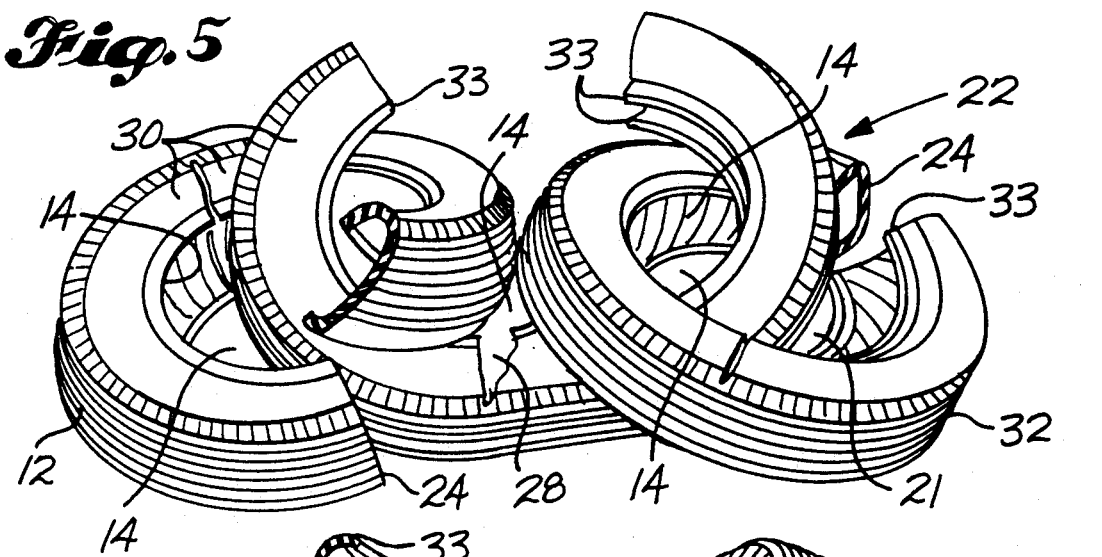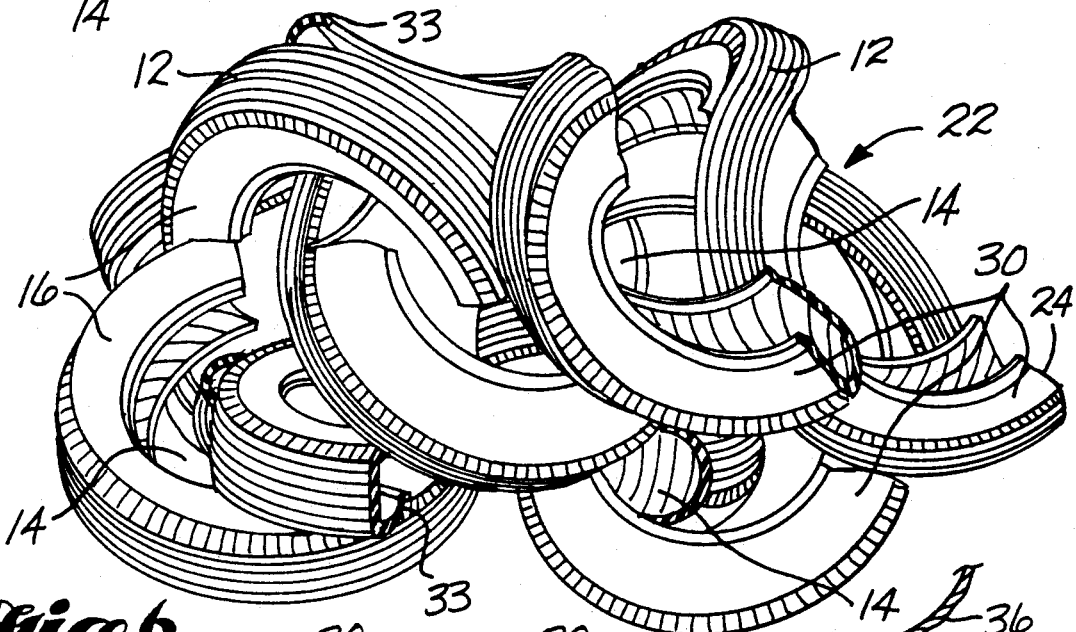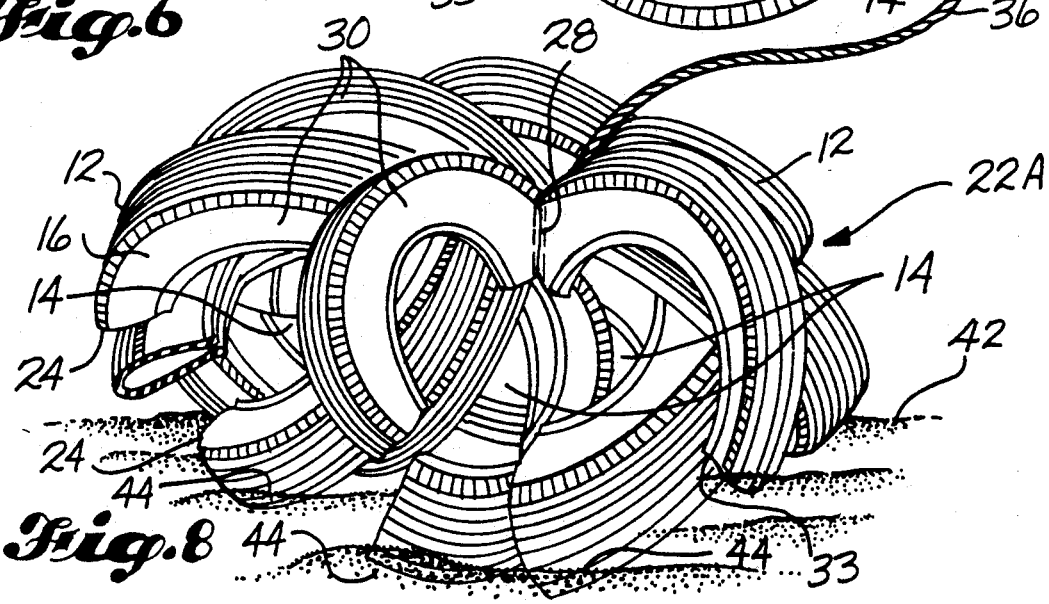

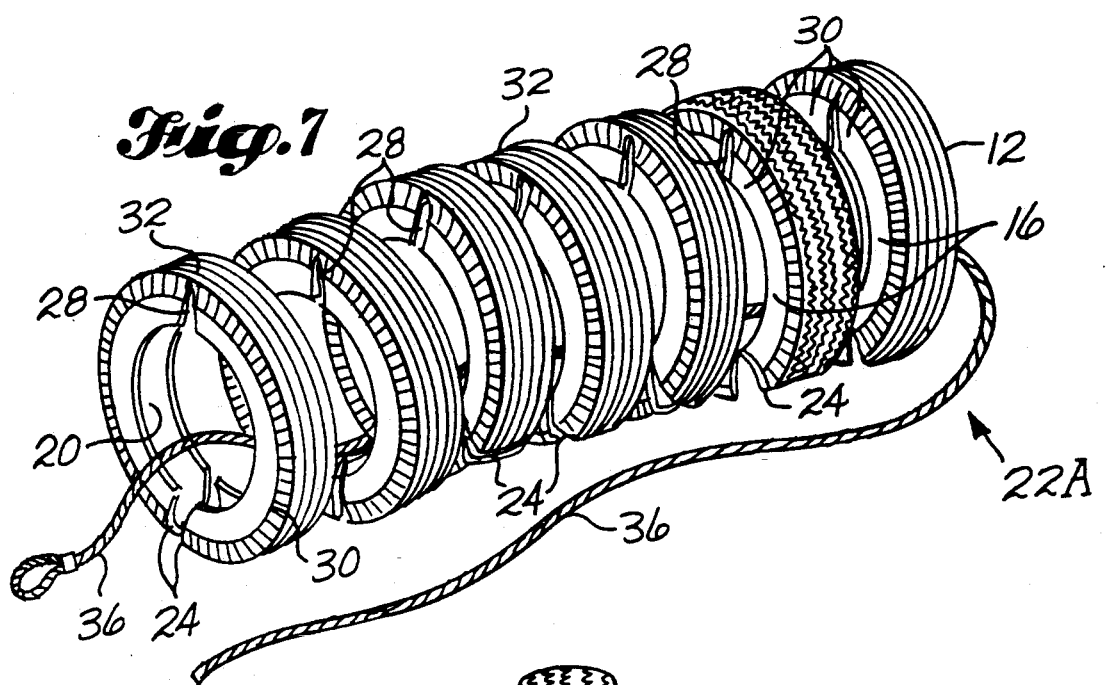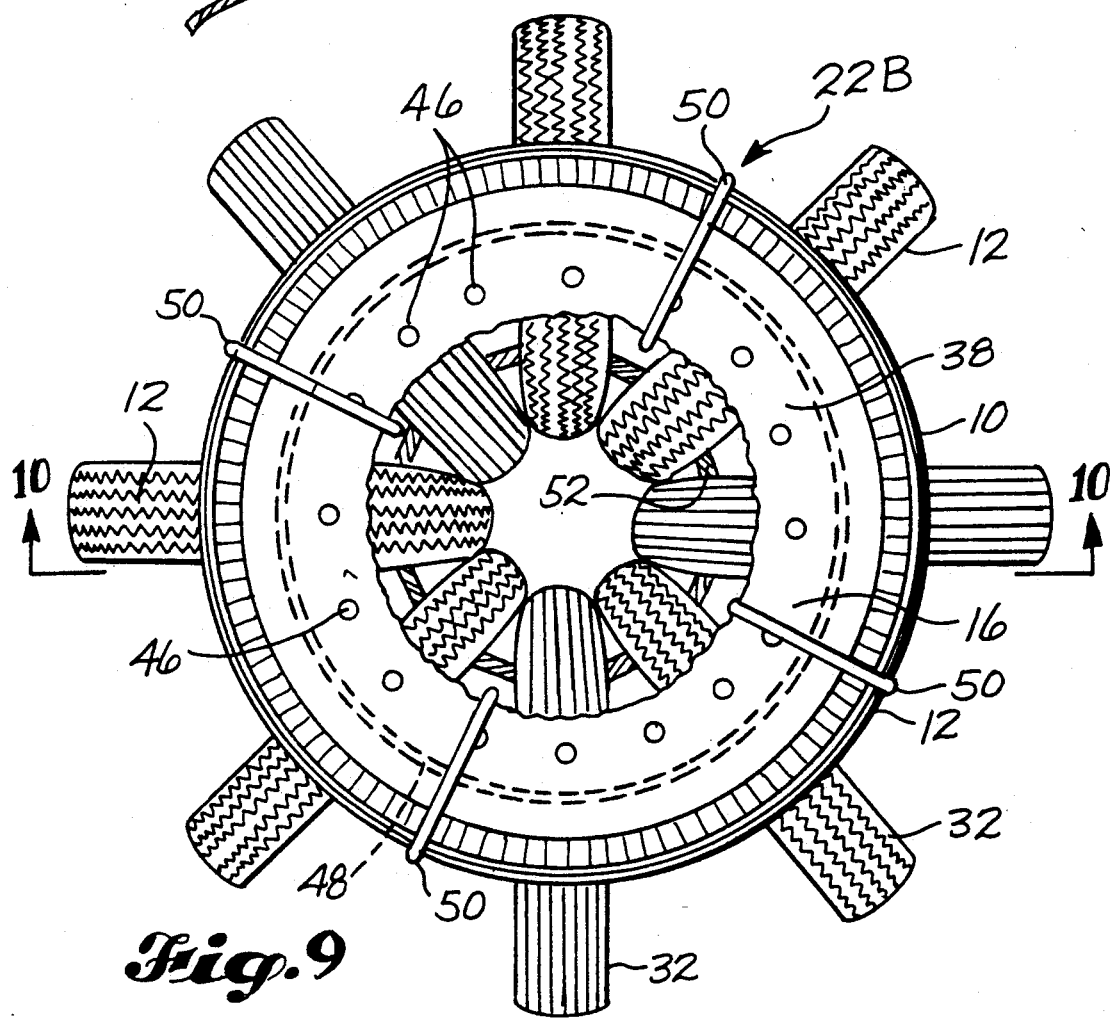

ARTIFICIAL REEF AND BEACH STABILIZER FORMED FROM AN ASSEMBLAGE OF VEHICLE TIRES

TECHNICAL FIELD

The invention relates generally to an artificial reef and a beach stabilizer, and more particularly, to a structure comprising vehicle tires and a method for making and using the structure in an aquatic setting as an artificial reef to provide a safe haven for aquatic life and a beach stabilizer to retard erosion.

BACKGROUND OF THE INVENTION

Aquatic life often flourishes in the area on and around an underwater structure, such as a coral reef or a sunken ship. The underwater structure provides a safe haven for small fish and crustacea, and the presence of these small forms of aquatic life attracts larger forms of aquatic life to the area. As the population of aquatic life increases, an aquatic ecosystem develops which is beneficial to commercial fishing and recreational sports, such as snorkeling and diving.

Coral reefs, seaweed beds, and rocky areas are natural structures which encourage the development of aquatic ecosystems and stability of beaches. Unfortunately, in some areas coral reefs and seaweed beds are dying. Other areas are barren of suitable natural structures. Without these structures in oceans, lakes, and streams, the population of aquatic life tends to be at a minimum.

Structures may be introduced into underwater areas to encourage the development of aquatic ecosystems. The composition of such structures should be suitable for underwater applications since some materials are not inert in aquatic settings. For example, metal materials will corrode in sea water, and thus, structures which include metal material will have a shortened useful life.

Ordinary vehicle tires are substantially inert in water, which makes them well suited for underwater applications. Structures for underwater use which include vehicle tires are described in Buchanan U.S. Pat. No. 4,196,693; Ledoux et al. U.S. Pat. No. 3,933,124; and Roehner U.S. Pat. No. 3,928,701.

Erosion is another problem in and around beach areas. The wave action of some bodies of water is eroding shorelines and bottom areas. As erosion progresses, beaches and shorelines disappear. Structures for retarding erosion in aquatic settings are described in Anderson et al. U.S. Pat. No. 3,884,042; Taylor U.S. Pat. No. 4,188,153; Hibarger et al. U.S. Pat. No. 4,150,909; and Roehner U.S. Pat. No. 3,928,701.

Vehicle tires pose a substantial disposal problem Once vehicle tires have worn out such that the tires may not be readily recapped for continued use, the tires must be disposed of. Tires are generally made of a synthesized rubber which does not decompose when disposed of in conventional manners.

Burying vehicle tires has proven to be an unsatisfactory means for disposal. Over a period of time, buried tires may "float" to the surface of the soil. Presently, tires are also disposed of in above ground dumps, but once again, this solution is not satisfactory. Besides creating an unsightly heap of tires, the pile of tires is a hazard if a fire is ignited. Burning tires release dangerous pollutants and are difficult to extinguish.

SUMMARY OF THE INVENTION

The present invention recycles vehicle tires, which would otherwise pose disposal problems and, as a result, solves some of the problems of decreasing aquatic life due to destruction of reefs and other natural environments. In addition, the present invention provides a structure for retarding the erosion of underwater areas due to wave action.

The vehicle tires each have opposite sidewalls and an interconnecting tread, providing a substantially U-shaped radial section configuration and defining an internal chamber. The tires are radially severed through the sidewalls and the tread, to provide opposite cut ends. Between the cut ends, each tire is partially cut to form tire sections connected together by an uncut portion. In an assemblage, the cut tires are oriented to position their cut ends apart, such that at least some of the cut ends are directed to engage the bottom and resist movement of the assemblage along the bottom. In addition, in the assemblage, the tires may be positioned in an expanded configuration.

The structure of the present invention may be used to provide an artificial reef. At least some of the tires are oriented to provide safe havens for marine animals within the assemblage. According to another aspect of the invention, the structure of the present invention may provide a beach stabilizer, to retard the erosion of the underwater area and retard the erosion of the shoreline adjacent the underwater area.

In preferred form, the cut tires are partially cut by severing substantially through the sidewalls while substantially maintaining an uncut tread portion.

According to another aspect of the invention, connectors are used for securing the plurality of tires together to form the assemblage. In one embodiment of the present invention, a connector, such as a cable, will encircle and bind together a plurality of cut tires, with the connector engaging the tires at the uncut tread portion such that the cut ends of each cut tire are oriented apart from each other.

According to another embodiment of the invention, the structure comprises a base with tires secured to the base by fasteners. In a preferred form, the base comprises an uncut tire or the like.

The present invention further comprises a method for providing a structure for use in underwater areas. According to the method, a plurality of vehicle tires are provided. Each tire has opposite sidewalls and an interconnecting tread. The method further includes severing or cutting at least some of the tires. Each severed tire is severed radially through the sidewalls and the interconnecting tread so as to form opposite cut ends, and partially severed radially at another location while maintaining an uncut portion. In a preferred form, the method comprises partially cutting tires by severing substantially through the sidewalls while substantially maintaining an uncut tread portion The method further comprises orienting apart the cut ends of each severed tire, and orienting the plurality of tires in an expanded configuration. The method further includes locating the assemblage to the bottom of a body of water. At least some of the cut ends grip the bottom such as to anchor the assemblage to the bottom.

According to a further aspect of the invention, the method comprises connectors for securing the plurality of tires together to form an assemblage. In one form, the method comprises securing the plurality of tires together with the connector to form the assemblage by encircling the plurality of cut tires with the connector. The connector engages the tires at the uncut tread portion such that the out ends of each tire are oriented apart from each other.

According to still another aspect of the invention, the method comprises providing a base and fasteners, and securing the tires to the base by use of the fasteners. In preferred form, the base comprises a tire or a plurality of tires.

Other important aspects and features of the present invention will become apparent by examination of the accompanying drawings, description of the preferred mode for carrying out the invention, and the appended claims, all of which are incorporated herein by reference as a disclosure of the present invention.

BRIEF DESCRIPTION OF THE DRAWINGS

Like reference numerals are used to designate like parts throughout the several drawings, and:

FIG. 1 is a pictorial view of a vehicle tire;

FIG. 2 is a pictorial view of the tire of FIG. 1 after it has been radially severed, once at a location through the sidewalls and tread, and once at another location through the sidewalls while maintaining an uncut tread portion;

FIG. 3 is another pictorial view of the tire shown in FIG. 2.

FIG. 4 is a pictorial view of the tire shown in FIGS. 2 and 3, which has been twisted about the uncut tread portion;

FIG. 5 is an assemblage of severed tires according to the present invention;

FIG. 6 is another assemblage of severed tires according to the present invention;

FIG. 7 is a pictorial view of severed tires in the process of being assembled with a connector;

FIG. 8 is an assemblage of the tires shown in FIG. 7;

FIG. 9 is a top view of an assemblage of tires with a base and a connector according to the present invention;

PREFERRED MODE FOR CARRYING OUT THE INVENTION

Figure 10:
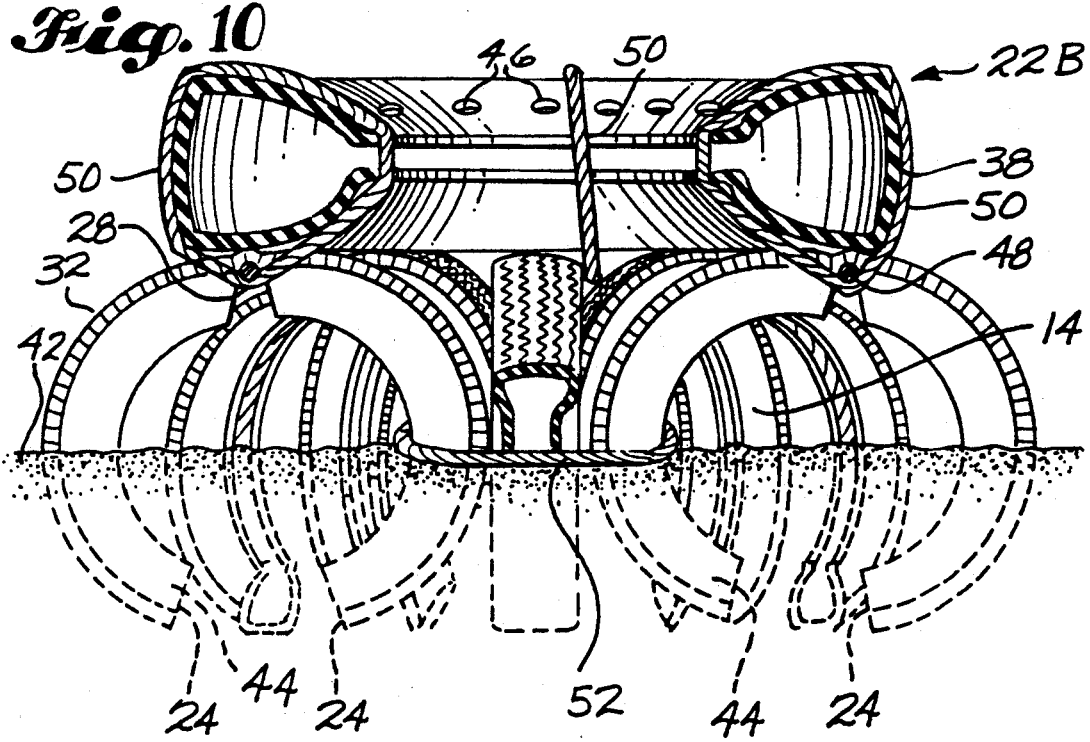
FIG. 10 is a sectional view of the assemblage shown in FIG. 9 taken substantially along line 10—10 of FIGS. 9 and 11.

The present invention provides an economically and environmentally viable application for ordinary used vehicle tires. By employing the present invention, some of the problems associated with disposing of used vehicle tires may be alleviated. Appropriately cut according to the present invention, vehicle tires may be introduced into an area on the bottom of a body of water as an artificial reef to encourage an increase in aquatic life in the area or as an erosion retarding structure or beach stabilizer.

The structure of the present invention is comprised of one or more particularly-cut vehicle tires. As used herein, vehicle tire refers to the tire casing of a pneumatic tire such as is commonly used on cars and trucks. Generally, during normal use of a vehicle tire, the tire is mounted to the rim of a vehicle wheel with or without a pneumatic inner tube between the tire and the rim. Vehicle tires are generally made of a synthetic rubber and fabric. The synthetic rubber does not decompose to any appreciable degree when disposed of in conventional manners.

The present invention provides a structure, and a method for using that structure, in areas on the bottom of a body of water. The structure comprises one or more vehicle tires which are useful singly or in an assemblage. When placed in an underwater area with a portion of the structure digging into the bottom and a portion of the structure above the bottom, the structure of the present invention may provide an artificial reef. Aquatic fauna, such as fish and crustacea, seek shelter in and around the reef. Aquatic flora may be encouraged to grow in proximity to the reef. Internal chambers of the tires and passageways defined within the overlapping of the tires provide safe havens for small fish and crustacea. By access to the safe havens, the small aquatic fauna population will tend to increase. Predators will be attracted to the area. Some of the small aquatic life will fall prey to larger aquatic life. As the food source for the larger aquatic life becomes more plentiful, the population of the larger aquatic life will increase. The interrelations of the aquatic life will develop into an aquatic ecosystem. In this way, the introduction of the structure of the present invention into an underwater area increases the aquatic life in an area, such that a barren area on the bottom of a body of water may become a habitat for aquatic life. Increased aquatic life is beneficial for preserving aquatic life forms. In addition, the increased aquatic life is beneficial to commercial fishing and crabbing. Also, aquatic ecosystems provide interesting destinations for recreational snorkelers and divers.

Further, the present invention provides a structure, and method for making and using that structure, which comprises an assemblage of vehicle tires as an underwater erosion controlling device or a beach stabilizer. To control erosion, the structure of the invention is located to the bottom of an underwater area. The structure anchors to the bottom and provides stability to the bottom, retarding erosion of the underwater area. As a consequence of this erosion control, shoreline adjacent the underwater area benefits in retarded erosion. The structure retards erosion when it is partially or completely buried at the bottom of the body of water. If the structure is only partially buried, the structure may serve as an erosion controlling device, as well as an artificial reef, as described above.

The structure of the present invention comprises an assemblage of vehicle tires. Vehicle tires for use in the present invention may be of various sizes, such as tires from cars, trucks, and heavy equipment. The tires may be new, but the present invention would be more economically viable when the vehicle tires were used. Used vehicle tires refers to tires which have been mounted on a vehicle wheel for use and have worn or blown out in such a manner that the tires may not be readily recapped for continued use. Even if the used vehicle tires have tears or holes, the tires may still be suitable for use in the present invention.

Referring first to FIGS. and 2, a vehicle tire 10 generally includes a tread 12 of synthetic rubber. Sidewalls 16 extend radially inwardly on either side of the interconnecting tread 12. When the tire 10 is used on a vehicle, the sidewalls 16 may extend over an inner tube to mount on a rim of a wheel of the vehicle. The tread 12 and sidewalls 16 provide the tire 10 with a U-shaped radial section 18. An internal chamber 20 is defined within the U-shaped cross section 18, which may house an inner tube during the normal use of a vehicle tire 10. The tread 12 may include reinforcers, such as steel, polyester, or glass fiber belts. Generally, the tread 12 is composed of materials and structured to be more sturdy than the sidewalls 16.

Vehicle tires 10 are composed of a material which is well suited for use in aquatic settings, since the tires 10 are virtually inert in water. Unfortunately, there are drawbacks in using an ordinary tire 10, as shown in FIG. 1, in underwater applications. First, it is difficult to sink an ordinary vehicle tire 10 to the bottom 42 of a body of water, since the tire 10 tends to trap air within the internal chamber 20, and the trapped air prevents the tire 10 from sinking. Even if the tire 10 sinks to the bottom 42, it may later float to the surface due to air which remains trapped or accumulates within the internal chamber 20. Naturally-occurring gases are constantly being produced under water. Some gases are released from the earth through the bottom of the body of water. Other gases are produced by plants and animals living in the water. Additionally, after a tire 10 has been sunk, an uncut tire 10 could tend to roll and slide on the bottom 42. Previously, an anchor would have been provided to prevent the tire 10 from rolling and sliding. Providing anchors can be expensive and time consuming.

The present invention overcomes the floatation problems of using vehicle tires 10 in aquatic settings by providing a tire 32 which is cut or severed in a specified manner. The tires 10 may be cut manually or by an automated system, with a shear or otherwise.

According to the preferred manner for cutting the vehicle tires 32, each tire is cut twice. At one location on the tire, the tire is radially severed completely through the sidewalls 16 and tread 12, forming opposite cut ends 24. A second partial cut is made in the tire at a location between the cut ends 24. The second cut severs a substantial portion of the sidewalls 16 and/or tread 12, while leaving a portion intact. In preferred form, the second cut substantially severs the sidewalls 16 while leaving an uncut tread portion 26 intact, as shown in FIGS. 2 and 3. A notch 28 is defined between the severed sidewalls, adjacent the uncut tread portion 26. Two tire sections 30 are defined on each cut tire 32, one on each side of the uncut tread portion 26, extending to the cut end 24. The uncut tread portion 26 has sufficient strength to keep the tire 32 from splitting into two pieces but is sufficiently flexible to allow the cut ends 24 to remain spread apart. The cut tire 32 may be twisted about the uncut tread portion 26 without tearing or splitting, as shown in FIG. 4.

Cutting of the tires provides openings to allow moving water to flow through the tire structure, whether single or an assemblage, thereby lessening hydrodynamic resistance and lessening the tendency to be moved by currents or tides. Flexibility of the cut tire allows it to adjust or conform to the flow to minimize resistance to the current.

This manner of cutting provides each section 30 of the cut tire 32 with four specially adapted corners 33 which tend to penetrate and anchor into mud, sand or gravel of the bottom of the body of water.

Each cut tire 32 should be positioned such that the cut ends 24 are apart from each other. When the out ends 24 are spaced apart, a cut tire 32 will tend to sink and remain sunk, since the cuts permit air to escape from the internal chamber 20 of the tire 32. Exposure of the gripping corners 33 and cut ends 24 cause the cut tire 32 to resist the effects of tides, currents and surf. Tires 32 cut in the specified manner achieve the goal of remaining substantially in place on the bottom of a body of water, even under such conditions. Such tires 32 will not drift away or be moved to a different location, will not work their way higher into an exposed position on a beach, and will not be carried to a deeper location where they will not perform the function of beach stabilization.

Additional benefits may be obtained by forming an assemblage 22 from a plurality of cut tires 32. A simple assemblage 22 of three cut tires 32 interlinked together is shown, for example, in FIG. 5. Such an assemblage 22 allows each tire 32 to be positioned in an expanded configuration beyond the normal plane of an uncut tire 10. This expanded configuration tends to expose additional cut ends 24 and corners 33 to facilitate firm attachment to the bottom. Additionally, the expanded configuration creates additional chambers 20 and safe havens 14 for aquatic life. This expanded configuration will also resist immediate burial of the cut tires 32 and to the sand, mud or gravel of the bottom surface in areas of heavy tide, current, or surf.

To achieve an expanded configuration, the cut tires 32 may be twisted about the uncut tread portion 26, or each tire section 30 may be slightly twisted. In addition, cut tires 32 may be positioned or linked together without being twisted, with the plurality of tires occupies planes outside of that occupied by a single, uncut tire 10. Examples of such configurations from a single cut tire 32 to a plurality of cut tires 32 forming an assemblage 22 are shown in FIGS. 4-6.

The inventor has found, after experimentation, that an assemblage 22 of a plurality of tires, positioned in an expanded configuration and with the cut ends 24 of each cut tire 32 spaced apart from each other, will not float on or to the surface of a body of water. Instead, when the assemblage 22 is placed on the surface of a body of water, the assemblage 22 will roll and turn in the water, releasing air from within the internal chambers 20, and sink to the bottom 42. Once the assemblage 22 has sunk, it will not float toward the surface of the water at a later time since the air has escaped from the internal chambers 20 of the tires. The naturally-occurring gases under water are continuously vented through the cut sidewalls 28 and ends 24. In addition, at least some of the cut ends 24 and corners 33 will dig into the bottom 42, such that the assemblage 22 will resist movement along the bottom 42. By the cut ends 24 and corners 33 digging into the bottom 42, the assemblage 22 is provided with a self-anchoring feature. Similarly, some of the cut ends 24 may attach and entangle with other assemblages 22 already placed on the bottom 42. By this entanglement, a plurality of assemblages 22 may be anchored to the bottom 42 to provide a complex structure, which may be used as an artificial reef, with many safe havens 14 for aquatic life, and/or as an erosion retarding structure.

The self-anchoring feature, which keep the assemblage 22 of tires from floating toward the surface or washing around on the bottom 42, is very important to the present invention. If the assemblage 22 did not remain in place after being located to the bottom 42 of a body of water, the assemblage 22 would be of minimal use. It is especially important that the assemblage 22 does not slip into deeper water where it will no longer perform the desired function.

Cut tires 32 may be oriented or positioned together by interlocking the notches 28 of cut tires 32 (not shown). By this interlocking, the cut ends 24 of each cut tire 32 will be forced apart. A plurality of tires 32 interlocked at the notches 28 of the cut tires 32 will provide an expanded configuration since the tires 32 must necessarily occupy different planes in order to be interlocked at the notches 28.

The tires may also be oriented together by the use of a fastener or connector. The fasteners or connectors may be of any suitable material for holding the tires in the desired positions. One assemblage 22A of tires is illustrated in FIGS. 7 and 8, with an elongated connector 36 passed through a plurality of cut tires 32. The connector 36 is slipped into the notches 28 in the sidewalls 16, adjacent the uncut tread portion 26, to lasso the cut tires 32. By cinching or tightening the connector 36, the notches 28 of each tire 32 are spread, forcing the cut ends 24 apart. When the connector 36 is lassoed in this manner around the plurality of tires, an assemblage 22 as shown in FIG. 8 is created. This assemblage 22 presents a multitude of cut ends 24 and corners 33 for anchoring the assemblages 22 to the bottom 42. The self-anchoring areas 44 are shown, where the cut ends 24 and corners 33 dig into the bottom 42. The connector 36 may be a cable, rope, or other suitable device for securing a plurality of tires together.

In preferred form, the connector 36 used for the assemblage 22A as illustrated in FIGS. 7 and 8 may be a long cable or rope. The connector 36 of the first assembly 22A may be tethered to another similar assemblage 22A, such that a plurality of assemblages 22A will be joined. After the tethered assemblages 22A are located to the bottom 42 of a body of water, the connector 36 will provide a further anchoring feature. If one of the assemblages 22 were to roll or slide on the bottom 42 because of an unusually strong current or storm, for example, the other assemblage 22 would keep it confined to the area. Such an assemblage 22A is very simple and inexpensive to construct. It is easily handled by crane or derrick simply by tieing to the tether or cable 36. If desired, two such assemblages 22A could be attached to opposite ends of a single cable 36.

Figure 11:
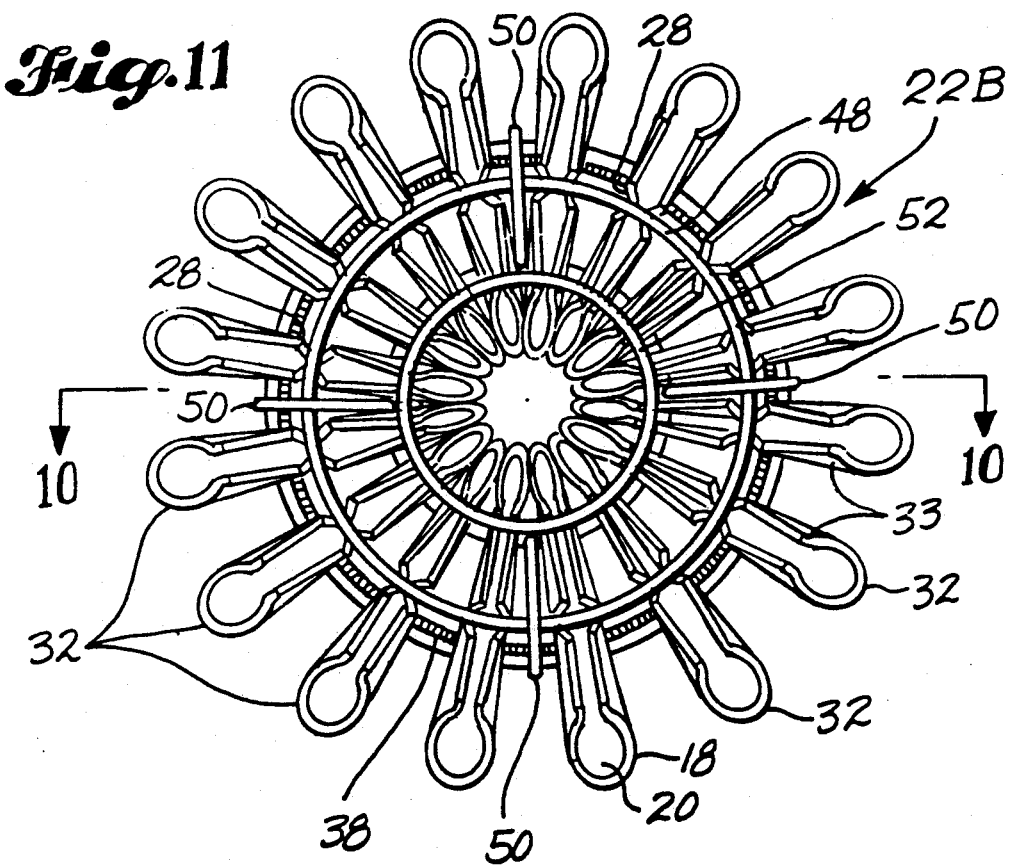
FIG. 11 is a bottom view of the assemblage of tires shown in FIGS. 9 and 10.

A more complex assembly 22B is shown in FIGS. 9, 10 and 11. A plurality of out tires 32 is mounted to a base 38 which is preferably a large uncut tire, such as a truck tire. Cut tires 32 are positioned radially around the circumference of the base 38. In preferred form, the cut tires 32 are attached at or near the uncut tread portion 26. They may be attached to a sidewall or a tread portion of the base tire 38.

The cut tires 32 may also be attached, for example, by inserting a hoop 48 or the like of significant bulk into the notches 28 of the cut tires 32. In this manner, cut ends 24 of the cut tires 32 are spread apart. All of the cuts 32 are then snugly bound to the base tire 38 by straps or bands 50 which extend around the base tire 38 between cut tires 32 and fasten the hoop 48 snugly to the base tire 38. These fastening bands 50 may be metal cables or straps or could be heavy nylon tie straps such as are used for clamping bundles of wire into a cable. In order to further assure that the cut ends 24 are spread apart and to add additional rigidity to the entire assemblage 22B, a tie band 52 may be positioned to encircle the inwardly directed sections 30 of the cut tires 32. In preferred form, this band or strap 52 may be the sidewall or bead portion cut from a whole tire 0. To install this band 52, the inwardly directed sections of the cut tires 32 are cinched or clamped together and then the circular band 52 is slipped over the cut ends 24. The band 52 will be held firmly in place by the natural spring tension of the cut tires 32.

The uncut tire 10 should have holes 46 punched or drilled in the sidewalls 16 such that air may be released from the internal chamber 20 of the tire 10. FIG. 10 is a sectional view of the assemblage 22B shown in FIG. 9. FIG. 10 shows the assemblage 22B located to the bottom 42, with some of the cut ends 24 anchoring the assemblage.

Once an assemblage 22, 22A, 22B has been formed, it may be located to the bottom 42 of a body of water by placing the assemblage 22, 22A, 22B on the surface of the water and allowing it to sink and anchor itself to the bottom 42. Tethered assemblages 22A would be located to the bottom in a similar manner, with one of the assemblages 22A placed first, followed by the others, one at a time. The self-anchoring feature of the assemblages 22 enhance the economic viability of the present invention.

Referring to the assemblage 22A shown in FIG. 8, such an assemblage 22A can be randomly dropped on the surface of the water to sink into place on the bottom 42. Referring to the assemblage 22B shown in FIGS. 9, 10, and 11, such an assembly will naturally orient itself on the surface of the water or as it sinks such that the cut ends 24 of the cut tires 32 will be oriented downwardly to engage the bottom 42. This is accomplished because air within the chambers 20 of the cut tires 32 will quickly escape. Air within the chamber of the uncut tire 38 will more slowly escape through vent holes. This will delay the descent of the entire assemblage until it is properly oriented.

The present invention further provides a method for creating structure for underwater use comprising an assemblage 22, 22A, 22B of tires. The structure may be utilized as artificial reefs for aquatic life on the bottom 42 of a body of water. Further, the structure may be utilized as an erosion controlling structure. In addition, the structure may be utilized for both purposes. According to the method, a plurality of tires 10 are provided. Some of the tires are cut in the manner described above. The plurality of tires are positioned together into an assemblage 22, with the plurality of tires in an expanded position, and with the cut ends 24 of each cut tire 32 spaced apart. The assemblage 22 may be secured together, such as by the use of connectors 36 or fasteners 34, in the manner previously described above. According to the method, the assemblage 22 is located to the bottom 42 of a body of water by placing the assemblage 22 on the surface of the water and allowing it to roll and turn in the water, releasing air from the internal chamber 20, sinking to the bottom 42. When the assemblage 22 has sunk to the bottom 42, at least some of the cut ends 24 will dig into the bottom 42, anchoring the assemblage 22.

The cut tires 32 and assemblages 22, 22A, 22B can form the foundation for an artificial reef structure providing internal chambers 20 and safe havens 14 for small forms of aquatic life. The safe havens 14 are areas in which aquatic fauna may seek shelter for feeding or from predators. The structure of the present invention also provides resistance to erosion of beaches and shorelines and can protect bottom life from destructive drag trolling.

From the foregoing, further modifications, assemblage arrangements, and methods of creating the structures of the present invention will be apparent to those skilled in the art to which the invention is addressed. For this reason, the foregoing descriptions of specific preferred embodiments is not to be construed to be limitive in nature, but exemplary only. The scope of my invention is to be limited instead only by the following claim or claims, interpreted according to accepted doctrines of claim interpretation, including the doctrine of equivalents.

What is claimed is:

1. A structure locatable on the bottom of a body of water, comprising:
    at least one vehicle tire, said tire including opposite sidewalls and an interconnecting tread, providing a substantially U-shaped radial section;
    said tire being radially severed through the sidewalls and the tread to provide opposite cut ends, and said tire being partially cut through between said cut ends to form tire sections connected together by an uncut portion; and
    such tire being oriented to position its cut ends apart and directed to engage the bottom and resist movement of the tire along the bottom.

2. The structure of claim 1, wherein said partial cut substantially severs said sidewalls while substantially maintaining an uncut tread portion.

3. The structure of claim 1, comprising a plurality of said cut tires interlinked into an assemblage of an expanded configuration beyond that of a single tire and such that said plurality of tires are operatively interrelated to maintain said cut ends apart from one another and exposed to engage said bottom.

4. The structure of claim 1, comprising a plurality of said cut tires and a connector for securing the plurality of tires together to form an assemblage, said connector encircling said plurality of cut tires and contacting said tires at such uncut portion such that said cut ends of said tires are oriented apart from each other.

5. The structure of claim 1, further comprising a base member to which a plurality of said cut tires are secured so that cut ends of said tires are exposed in a spread apart position.

6. The structure of claim 5, wherein said base member includes a vehicle tire.

7. A method for providing a structure for use in underwater areas, comprising the steps of:
    providing at least one vehicle tire, said tire having opposite sidewalls and an interconnecting tread, defining a U-shaped radial section;
    severing said tire at a first location radially through the sidewalls and the interconnecting tread such that said tire has opposite out ends formed where the tire was severed;
    partially severing said tire at a second location while maintaining an uncut portion;
    orienting said cut ends of said severed tire apart from each other to expose said cut ends; and
    locating the cut tire to the bottom of a body of water, wherein the cut ends are presented to grip the bottom such as to anchor the tire against significant movement from said location.

8. The method of claim 7, wherein partially severing said tire at said second location is accomplished by severing substantially through said sidewalls while substantially maintaining an uncut tread portion.

9. The method of claim 7, further comprising the steps of:
    providing a plurality of said cut tires;
    providing a connector; and
    securing the plurality of tires together with said connector to form an assemblage by said connector encircling said severed tires and contacting said tires at said uncut portion such that said cut ends of each said severed tire are oriented apart from each other.

10. The method of claim 7, further comprising the steps of:
    providing a base member; and
    securing a plurality of said cut tires to said base member such that said cut ends are oriented apart from each other.

* * * * *

UNITED STATES PATENT AND TRADEMARK OFFICE
CERTIFICATE OF CORRECTION

PATENT NO. : 5,238,325
DATED : August 24, 1993
INVENTOR(S) : Leo M. Krenzler

It is certified that error appears in the above-identified patent and that said Letters Patent is hereby corrected as shown below:

Title page, item [57], the Abstract, the 10th line from the bottom, "out" should be -- cut --.

Column 1, line 55, there is a period after "problem".
Column 2, line 58, there is a period after "portion".
Column 3, line 4, "out" should be -- cut --.
Column 4, line 60, after "Figs.", insert -- 1 --.
Column 5, line 64, "out" should be -- cut --.
Column 7, line 45, "out" should be -- cut --.
Column 7, line 67, "tire 0" should be -- tire 10 --.
Claim 7, column 10, line 12, "out" should be -- cut --.

Signed and Sealed this

Twenty-sixth Day of April, 1994

Attest:

BRUCE LEHMAN

Attesting Officer  Commissioner of Patents and Trademarks